US012644734B2

(12) United States Patent
Makkinga

(10) Patent No.: US 12,644,734 B2
(45) Date of Patent: Jun. 2, 2026

(54) FASTENING DEVICE FOR A SENSOR AND A SENSOR UNIT

(71) Applicant: Turck Holding GmbH, Halver (DE)

(72) Inventor: Alexander Magnus Makkinga, Mülheim an der Ruhr (DE)

(73) Assignee: Turck Holding GmbH, Halver (DE)

( * ) Notice: Subject to any disclaimer, the term of this patent is extended or adjusted under 35 U.S.C. 154(b) by 275 days.

(21) Appl. No.: 18/480,543

(22) Filed: Oct. 4, 2023

(65) Prior Publication Data

US 2024/0125630 A1     Apr. 18, 2024

(30) Foreign Application Priority Data

Oct. 12, 2022     (DE) ...................... 10 2022 126 588.9

(51) Int. Cl.
    G01D 11/30          (2006.01)
(52) U.S. Cl.
    CPC .................................... G01D 11/30 (2013.01)
(58) Field of Classification Search
    CPC ...................................................... G01D 11/30
    See application file for complete search history.

(56) References Cited

U.S. PATENT DOCUMENTS

| | | | | |
|---|---|---|---|---|
| 5,644,093 A | * | 7/1997 | Wright | G01D 11/245 |
| | | | | 73/866.5 |
| 7,210,961 B2 | * | 5/2007 | Berg | G01D 11/245 |
| | | | | 439/574 |
| 7,667,614 B2 | * | 2/2010 | Helm | H01H 9/161 |
| | | | | 362/240 |
| 2005/0173626 A1 | * | 8/2005 | Berg | H03K 17/9505 |
| | | | | 250/239 |
| 2021/0109423 A1 | * | 4/2021 | Ramones | F16M 13/02 |

FOREIGN PATENT DOCUMENTS

| | | | | | |
|---|---|---|---|---|---|
| DE | 20019722 U1 | * | 2/2001 | ............. | G01D 11/30 |
| DE | 10147023 A1 | * | 4/2003 | ........... | H03K 17/945 |
| DE | 203 01 144 U1 | | 6/2004 | | |
| DE | 102006007710 A1 | * | 8/2007 | ........... | B60R 19/483 |

(Continued)

OTHER PUBLICATIONS

European Search Report issued in EP 23 196 671.4, which is a counterpart hereof, mailed Feb. 15, 2024 (English language machine translation enclosed).

(Continued)

*Primary Examiner* — Jamel E Williams
(74) *Attorney, Agent, or Firm* — Pearl Cohen Patentanwälte PartGmbB; Michael McCandlish

(57)          ABSTRACT

A mounting unit for an electronic terminal has a mounting body with a support surface for the electronic terminal and at least one contact surface for at least one-sided contact with a support element. Further, the mounting unit has at least one fastening element for attaching the mounting unit to the support element, wherein the support surface has an angle of inclination to the at least one contact surface, wherein an electronic terminal is rotatably arranged about an axis of rotation on the support surface, and wherein at least one pivotable locking element is provided by means of which the electronic terminal is lockable into its position. Furthermore, an electronic terminal with such a mounting unit is disclosed.

17 Claims, 4 Drawing Sheets

(56) References Cited

FOREIGN PATENT DOCUMENTS

| DE | 202015101923 U1 * | 7/2016 | ............. G01D 11/30 |
| DE | 202015104895 U1 * | 12/2016 | ............. F16B 2/065 |
| DE | 102017103512 A1 * | 5/2018 | ............. G01D 11/30 |
| EP | 0737847 A1 * | 10/1996 | ........... G01F 23/296 |
| EP | 1 492 977 B1 | 12/2005 | |
| WO | 2004/047246 A1 | 6/2004 | |

OTHER PUBLICATIONS

German Search Report issued in DE 10 2022 126 588.9, to which this application claims priority, mailed Jun. 2, 2023 (English language machine translation enclosed).

* cited by examiner

FASTENING DEVICE FOR A SENSOR AND A SENSOR UNIT

CROSS REFERENCE TO RELATED APPLICATIONS

This application claims priority to German patent application DE 10 2022 126 588.9 filed on Oct. 12, 2022, which is hereby incorporated by reference in its entirety.

TECHNICAL FIELD

The present disclosure relates to a mounting unit for an electronic terminal and an electronic terminal.

BACKGROUND

Mounts for sensors or other point-of-use devices which specify a fixed orientation of the sensor to the mount or are designed to be adjustable are known from the related art.

An important feature of such sensors and electronic terminals (or terminal devices) is that the position of the active area such as the detection side can be adapted to the current conditions in the field.

For example, WO 2004/477246 A1 discloses a mount in the form of a housing for accommodating an electrical sensor additionally having a display for displaying different electrical states from different lines of vision. The sensor's orientation to the housing is fixed in said housing so that the orientation of the entire housing must be changed in case of a realignment of the sensor.

DE 10147023 A1 proposes an improvement in which a fastening device for sensors is equipped with a housing to accommodate the sensor, wherein a separate mounting plate is provided for fastening it to a surface so that fastening means are provided between the housing and the mounting plate for releasably fastening the housing to the mounting plate. As a result, the fastening means are designed in such a manner that the orientation of the housing relative to the mounting plate is adjustable. DE 10147023 A1 further discloses that the orientation of the housing relative to the mounting plate can be incrementally adjusted by 90°, respectively.

This fastening element is in principle well suited to enable different orientations for an electronic terminal, although easier handling of the fastening element and/or the electronic terminal would still be desirable.

SUMMARY

It is an object of the present disclosure to provide an improved fastening element and an improved electronic terminal.

This object is solved according to the present disclosure by a mounting element having an electronic terminal and such a mounting element. Exemplary embodiments are disclosed in detail below.

Accordingly, the object is solved by a mounting unit for an electronic terminal. The mounting unit comprises
a mounting body with a support surface for the electronic terminal and at least one contact surface for contacting at least one of the contact surfaces on the support element,
at least one fastening element for attaching the mounting unit to a support element, wherein the support surface includes a (non-zero) angle of inclination to at least one contact surface, primarily particularly including an inclination angle of 30° to 60°, particularly including an inclination angle of 45°, and wherein the electronic terminal is rotatably arranged about an axis of rotation on the support surface. At least one pivotable locking element is also provided by means of which the electronic terminal can be locked into its position.

The support surface may in particular be designed as a flat surface.

Furthermore, the at least one contact surface may be designed as a flat surface.

In particular, the axis of rotation around which the terminal device is rotatably mounted on the support surface can be perpendicular to the support surface.

Herein, an electronic terminal is to be understood as any point-of-use device of an automation network, also referred to below as a terminal device or terminal for short. In particular, terminal devices can be sensors, actuators, and/or a data receiving unit, such as an NFC (near-field communication) receiver, RFID (write) reading head, or an IR data receiver. They can also be another emitter sending, e.g., a beam of light, a sound wave, or another signal. The terminal devices in particular have a foot surface complementary to the support surface of the mounting unit which is supported by or is in contact with the support surface of the mounting unit. The support surface of the mounting unit and/or the foot surface of the electronic terminal are advantageously a one-part construction or a multi-part construction. Additionally, an improvement may be that latching means are provided on the foot surface and/or the support surface, enabling a defined rotational position to be set safely.

The angle of inclination that the support surface has relative to an external contact surface correlates with the desired orientation and number of orientations of the electronic terminal and is not restricted. It is typical that the angle of inclination of the usual vertical support elements is 45° or an integer fraction thereof, such as 45°/2 or 45°/3, so that an orientation change of 90° of the electronic terminal can be achieved in a rotation angle position.

In other words, the support surface forms a triangle with the connection side and a contact surface of the mounting unit in the side view or a section view, wherein the angle of inclination faces the connection side.

The mounting unit and the electronic terminal are, in principle, provided on any type of support element, so that the support element is not to be understood as restrictive and in particular can be a wall, a beam, a column, a holding arm and/or another load-bearing and/or supporting component.

Herein, a fastening element is to be understood as any element which can accommodate, guide, and/or hold a fastening means, such as a screw. Herein, a fastening element is typically an eyelet, a hole and/or a nut thread, more typically an eyelet, hole, and/or nut thread that is open on both sides.

A contact side is defined by the interaction of the fastening element with an associated fastening means, wherein the contact side can be placed in contact with a support element and pressed onto the support element while applying force.

Typically, the at least one pivotable locking element is mounted and pivotable on the mounting unit in such a way that the locking element prevents the electronic terminal from rotating about the axis of rotation in a locking position and allows the electronic terminal to rotate in an unlocking position.

In an exemplary embodiment, it may be provided that the locking element, on the side opposite the terminal device in the locking position, has a non-positive and/or positive latching and/or guiding geometry and/or that a damping element, in particular an elastic damping element, is provided.

This latching and/or guiding geometry may, for example, contain a tongue-and-groove arrangement, a hook-and-eye arrangement, or comparable arrangements. Alternatively, friction or clamping elements protruding from the locking element may be provided which can be placed non-positively on the side of the housing of the terminal in the locking position.

In this way, vibration can be reduced, and accidental rotation of the terminal device can be prevented if the locking element is not completely pivoted into the unlocking position.

In an exemplary embodiment, it may be provided that the locking element can be pivoted about a pivot axis which is aligned parallel to the support surface and at least one contact surface.

Typically, the pivot axis of the locking element is aligned parallel to the support surface and to two contact surfaces.

In order to provide a tamper-proof locking position, a particular advantage can be that in a further exemplary embodiment the locking element may be provided with a fastening element.

In particular, it may be advantageous if the fastening element is a through hole, through nut, nut thread section or through eyelet. In this way, when the mounting unit is attached to or on a support element, a final, permanent fixation is also achieved for the terminal device relative to the mounting unit. In order to change the rotational position of the electronic terminal, the entire mounting unit must be released, and the locking element must be pivoted so that accidental changes can be wholly or largely reliably prevented. An advantage of this can be that a through nut or a through nut thread section is provided on a subsection of the through hole.

For a particularly versatile use, in one exemplary embodiment, it may be provided that the locking element is equipped with at least two fastening elements, wherein at least two fastening elements are aligned perpendicularly or transversely to one another.

Here, perpendicularly or transversely to one another means that the longitudinal or thrust axes for the fastening means, such as for two screws to be used, are perpendicular or transverse to one another.

A further improvement may be that at least one fastening element is a through hole or an eyelet. Ideally, a fastening element is aligned parallel to the pivot axis of the locking element.

Typically, it may be provided that at least one of the fastening elements designed as a through hole is provided in an end position of the locking element with a common (drilling) axis, which is guided through the locking element and the fastening element.

In other words, at least one fastening element is guided as a through hole and/or eyelet in such a way that in the locking position, which is also the fixing position, a partial length of the through hole or the eyelet is arranged in the locking element and is guided perpendicularly or transversely to the axis of rotation and a partial length of the through hole or another eyelet is guided in the mounting body.

In this way, the locking element is reliably closed and fixed in position by a fastening means guided in the through hole and/or the eyelet.

In an exemplary embodiment, it may be provided that the mounting unit has a recess in the alignment of the through hole of a locking element located in the locking position.

This recess is such that it is bridged by a fastening means, such as a screw, in order to be able to be fastened in or on the support element in a complementary counter-fastening element, such as a nut thread.

In a further exemplary embodiment, it may be provided that the fastening element has at least one bearing section on which the electronic terminal is rotatably mounted, in particular rotatably mounted by means of a complementary counter-bearing section.

Such a bearing section and/or a counter bearing may typically be designed as a one- or two-sided plain bearing. An improvement may be that the bearing section and/or the counter bearing has a finger-like bolt or pin having hooks or clips at its free end which are fixed in the respective counter element in a non-positive and/or positive manner so that they are secured from falling out in the direction of the axis of rotation.

In a further exemplary embodiment, it may be provided that the locking element contains at least two sub-elements, wherein the sub-elements are pivotable about the same pivot axis or respectively about one of two mutually parallel pivot axes.

In another exemplary embodiment, the at least two sub-elements of the locking element have a contour at the free ends that in the locking position engage non-positively and/or positively with each other. The at least two sub-elements of the locking element are typically pivotally mounted on two pivot axes which are aligned parallel to one another.

In a further exemplary embodiment, it may be provided that the locking element has a lead-through opening. This lead-through opening is used in particular to lead through a plug or a plug connector and/or a cable, such as a two-core or multi-core cable for power supply and/or data transmission for the electronic terminal.

In addition, displays arranged in the mounting unit, such as an LED, can also be supplied with power.

This exemplary embodiment may be further improved in that the single- or multi-part locking element has a recess on the side facing the support surface for positive and/or non-positive reception of at least one partial contour of a plug connector.

In particular, the recess is such that a flange or head region of a plug or a plug connector is held clamped with at least a partial section and/or a partial circumference in the locking position of the locking element. An improvement here may be that a clamping support is provided on the inner surface of the recess which clamps the flange or head region of a plug or a plug connector with at least a partial section and/or a partial circumference in the locking position.

There may be a further need additionally to prevent the unintentional change in the rotational position of the electronic terminal and/or to establish a secure connection together with the mounting unit during transport and storage of the electronic terminal. Therefore, in a further exemplary embodiment, it may be provided that the locking element can be pivoted about a pivot axis and can be raised and lowered transversely to the pivot axis.

When an electronic terminal is attached to a support element, this raising transversely to the pivot axis is a preceding unlocking step. In a first step, for example, the fastening means must be released and removed. In this exemplary embodiment, prior to the actual unlocking by pivoting the locking element from the locking position into the unlocking position, the locking element must be raised in the locking position transversely to the pivot axis before it is possible to pivot the locking element into the unlocking position.

For this purpose, the locking element has, for example, in the area of the pivot axis, one or more elongated holes in which the pivot axis is mounted and whose outer contour can be accommodated in a complementary opening or recess in the mounting body.

The disclosure further comprises an electronic terminal which has a housing with a plurality of sides, wherein one side is the end face serving as a detection and/or functional side, wherein a mounting unit is arranged on the housing which is designed according to one of the aforementioned embodiments and variants.

The electronic terminal is typically dimensioned cuboid and in particular cube-shaped or largely cube-shaped.

In an exemplary embodiment, it may be provided that the electronic terminal has a foot surface that has the same or essentially the same dimension as the support surface of the mounting unit.

In a further exemplary embodiment, the electronic terminal is a sensor, an actuator, and/or a data detection device.

As already outlined above, an electronic terminal should be understood to mean any point-of-use device, in particular as used in the automation of treatment plants. In particular, they encompass sensors, actuators, and/or transmitting and receiving units for data or other physical parameters.

All aspects, advantages and features of the mounting unit and/or the stand-alone electronic terminal should apply identically or in an analogous manner to the combination of the mounting unit and the electronic terminal, unless something different is explicitly stated. Likewise, all aspects, advantages and features of the electronic terminal that were mentioned in connection with the mounting unit shall also apply for the combination of the mounting unit and the electronic terminal and/or for an electronic terminal, including a mounting unit, and vice versa.

It is also noted that in the context of the present patent application, indefinite articles and indefinite numerical information such as "one . . . ", "two . . . " etc. should generally be understood as minimum information, i.e., as "at least one . . . ", "at least two . . . " etc., unless it is apparent from the context or the specific text reference that only "exactly one . . . ", "exactly two . . . " etc. is meant there.

It is important to note that in the context of the present patent application the expression "in particular" is always to be understood as meaning that this expression introduces an optional, preferred feature. The expression is not to be understood as "in fact" or as "namely."

The great advantage of this solution is that intuitive operation is possible to change the position and orientation of the (active) end face of the electronic terminal without tools. Very high flexibility can be achieved using fewer mechanical parts. In addition, no separate mounts, bearing plates or other loose parts are required.

Typically, individual components of the element described as "one-piece" are firmly bonded to each other.

BRIEF DESCRIPTION OF THE DRAWINGS

Further details and advantages of the disclosure will now be explained in greater detail with reference to the exemplary embodiments that are illustrated in the drawings. The disclosure will now be described with reference to the drawings wherein.

DESCRIPTION OF EXEMPLARY EMBODIMENTS

Figure 1:
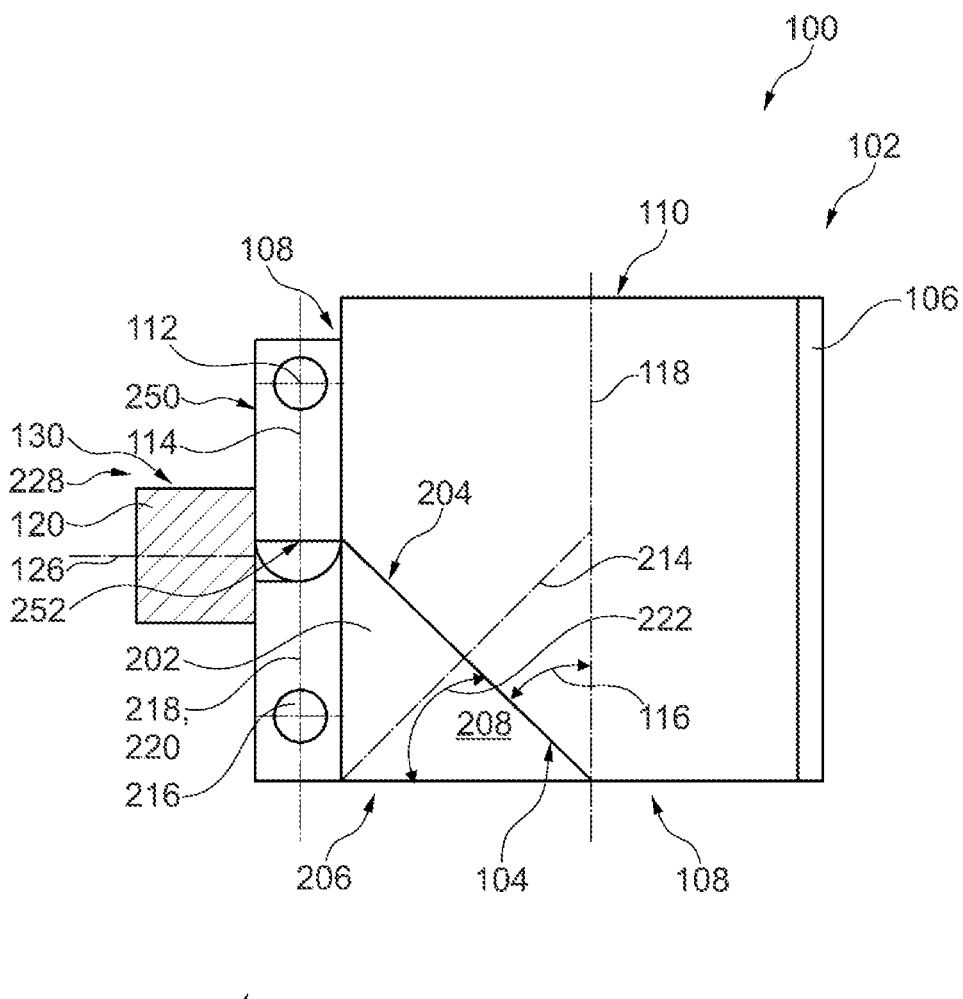
FIG. 1 shows an exemplary embodiment as a top view of a mounting unit and an electronic terminal in the locking position.

FIG. 1 shows a schematic design of a mounting unit 200 for an electronic terminal 100 which herein is an inductive proximity sensor. It comprises:

a mounting body 202 with a support surface 204 for the electronic terminal 100, three contact surfaces 206, 208 and a connection side 228, wherein the contact surface 208 is shown in the image plane and is present analogously on the back. In the top view shown, the mounting body 202 is shown as a triangle and the underside shown is the first possible contact surface 206 and the two thereto vertical, approximately triangular side surfaces are the further contact surfaces 208, of which only the front contact surface 208 can be seen in the illustration.

In the exemplary embodiment, the support surface 204 in particular is designed as a plane surface.

Furthermore, in the exemplary embodiment, at least one contact surface 206, 208 is designed as a plane surface. In particular, all three contact surfaces 206, 208 can be designed as plane surfaces.

Furthermore, three fastening elements 216, 218, 220 are provided in the mounting body 202 for attaching the mounting unit 200 to a support element, wherein only the position of the axis of the through hole which represents the fastening element 218 is shown for the fastening element 218. The fastening element 220 is aligned parallel thereto so that the two axes overlap in the top view.

In one exemplary embodiment (not shown), an internal (nut) thread is attached to a subsection of a fastening element 216, 218, 220 designed as a through hole for vibration-free attachment.

The mounting body 202 has an inclined support surface 204 which includes an angle of inclination 222 of 45°, respectively, with the lower contact surface 206 and the rear connection side 228.

The electronic terminal 100 is rotatably arranged on the support surface 204 in a plain bearing (not shown) and can be rotated about an axis of rotation 214. In the example, the axis of rotation 214 extends perpendicular to the support surface.

The electronic terminal 100 has a housing 102 with a foot surface 104, an end face 106, a side panel 110 and four rear sides 108. The rear sides 108 are determined such that they are moveable into a rear position by rotating the housing 102 about the axis of rotation 214, so that they can form part of the rear connection side 228 by rotation.

The upper side panel 110 illustrated in FIG. 1 is not moveable into such a rear position.

The actual electronic parts and components of the electronic terminal 100 are not shown. In the illustration in FIG. 1, the end face 106 points to the right and faces the connection side 228 of the mounting body 202 or the mounting unit 200, respectively.

The housing 102 essentially has a cube shape with an edge length measuring 40×40×40 mm. The aforementioned edge length is very advantageous in automation technology, although the edge lengths are not limited to this and can, for example, be in the range from 10×10×10 mm to 100×100× 100 mm.

The end face 106 is the functional or detection surface of the sensor and their orientation of which is decisive for the desired function.

The mounting unit 200 has a pivotable locking element 250 which is swivelably mounted on a swivel axis 252 perpendicular to the image plane. The locking element 250 is shown in its locking position resting in which it is in contact with the rear 108 of the electronic terminal 100 or its housing 102, respectively. The electronic terminal 100 is hereby locked in its rotational position.

The locking element 250 has three fastening elements 112, 114, of which one fastening element 112 extends in the direction of the image plane and is shown as an opening in the locking element 250. The other two fastening elements 114 are transversely or vertically at an angle of 90° and are shown as a dash-dot line. In the exemplary embodiment shown, the fastening elements 112, 114 are designed as through holes. In one exemplary embodiment (not shown), an internal (nut) thread is attached to a subsection of at least one fastening element 114, 220 designed as a through hole for vibration-free attachment.

In an analogous manner, the foot surface 104 of the electronic terminal 100 is also inclined by 90° minus the inclination angle 222 of the support surface 204 relative to a plane 118 parallel to the end face 106 so the foot surface 104 is also inclined by an angle of inclination 116 of 45° relative to the plane 118.

As can be seen in FIG. 1, the locking element 250 is fixed in the locking position when a fastening means such as a screw is guided through the fastening element 112 or through at least one of the fastening elements 114 extending perpendicular thereto. Here, the fastening element 114 continues in the mounting body 202 and a fastening element 218 therein so that the two fastening means 114, 218 form a common fastening means which are penetrated by a common fastening means in the case of fastening. Useful damping means such as elastic washers or contact mats to prevent vibration and damage to the electronic terminal 100 are not shown.

Furthermore, a plug connector 120 is provided whose plug axis 126 is aligned perpendicular to the connection side 228 and having a thread 130 on the outside for a union nut for a mating connector (not shown).

Figure 2:
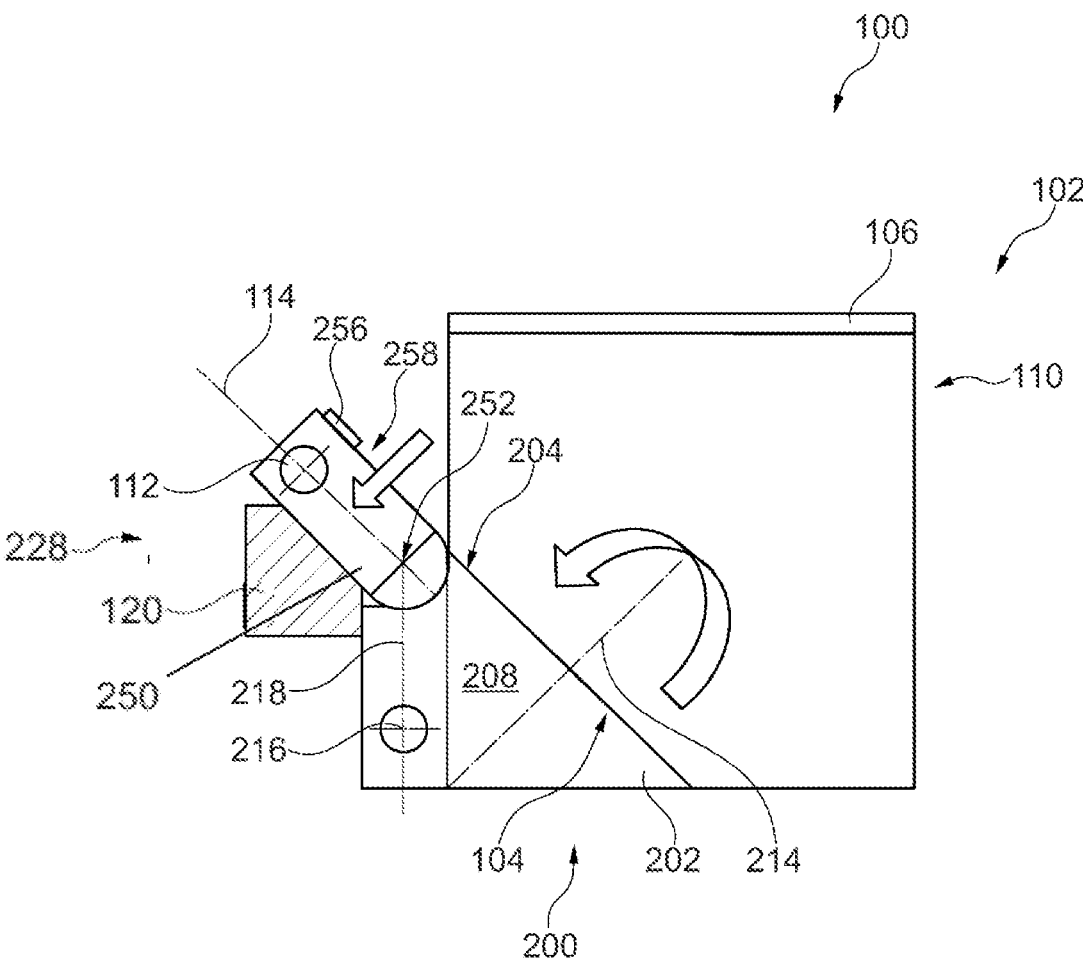
FIG. 2 shows the exemplary embodiment according to FIG. 1 as a top view in the unlocking position.

The exemplary embodiment according to FIG. 2 corresponds to the exemplary embodiment according to FIG. 1, wherein the locking element 250 is moved into the unlocking position in which the electronic terminal 100 can be rotated about the rotation axis 214.

In the exemplary embodiment shown, the locking element 250 lies in the unlocked position on the connector 120 and the housing 102 can be rotated about the axis 214. In order to get from the position of the end face 106 of the electronic terminal 100 according to FIG. 1 to the position of the end face 106 according to FIG. 2, the electronic terminal 100 or its housing 102, respectively, was rotated about the axis 214 by 180°. In the drawing, the end face 106 thus points upwards after rotation and adjoins the connection side 228 of the mounting unit 202.

As can be seen in FIG. 1 and FIG. 2, the locking element 250 has a radius on the bearing side which is guided in a corresponding counter contour in the mounting unit. In the unlocking position or in a transition position, the inside 258 of the locking element 250 and the support surface 204 span a common surface. Alternatively, the inside 258 forms a parallel, recessed plane in the unlocking position or in a transition position so that the electronic terminal can be rotated about the axis of rotation 214 without interference.

On the inside 258 of the locking element 250, a damping element 256 in the form of an elastic molding is glued, enabling vibration damping between the housing 102 of the electronic terminal 100 and the locking element 250.

Figure 3:
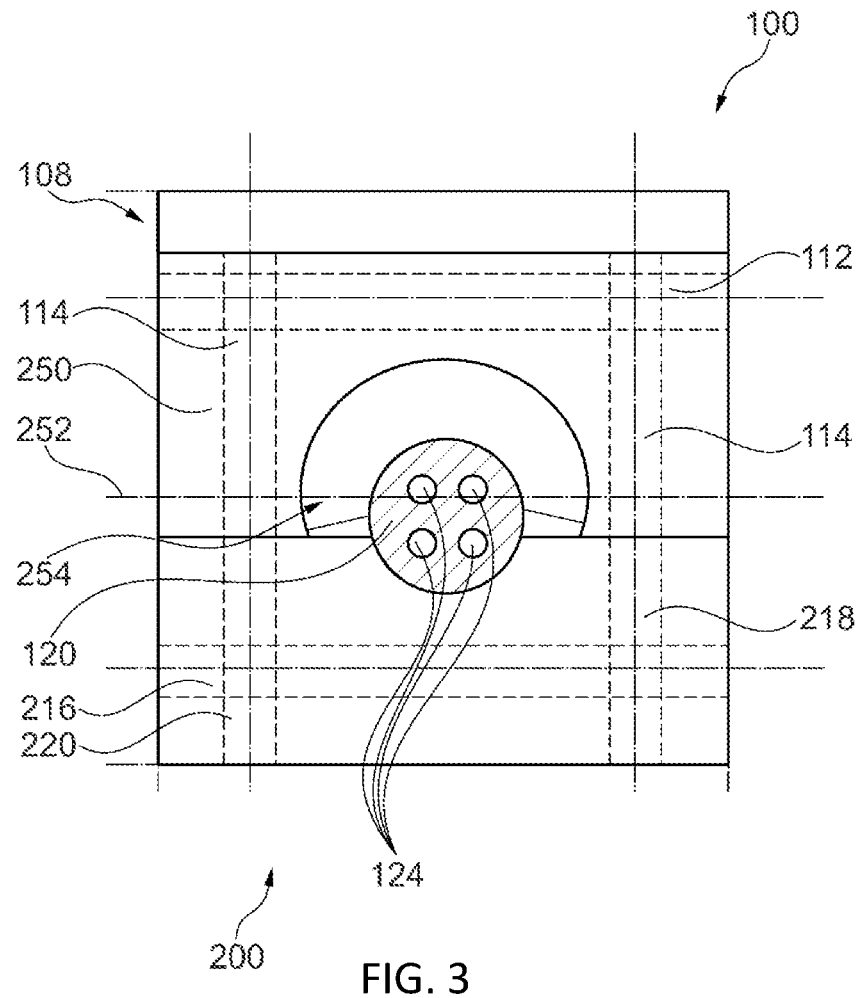
FIG. 3 shows an exemplary embodiment comparable to FIG. 1 as a top view of the connection side.

In the exemplary embodiment according to FIG. 3, the electronic terminal 100 with the mounting unit 200 is shown from the line of vision of the connection side 228, wherein the locking element 250 is in the locking position.

The fastening elements 112, 216 aligned parallel to the swivel axis 252 and the pairs of fastening elements 114, 218 and fastening elements 114, 220 that complement each other in the locking position can be seen there.

In the exemplary embodiment, the locking element 250 has a lead-through opening 254 enabling access to a plug connector in the mounting body 202 and thus to the electronic terminal 100. The lead-through opening 254 is widened conically. The lead-through opening 254 is in transition from the mounting body 202 and the locking element 250 so that a part of the opening is also provided in the mounting body 202 which together with the opening part in the locking element 250 form a circular lead-through opening 254.

Figure 4:
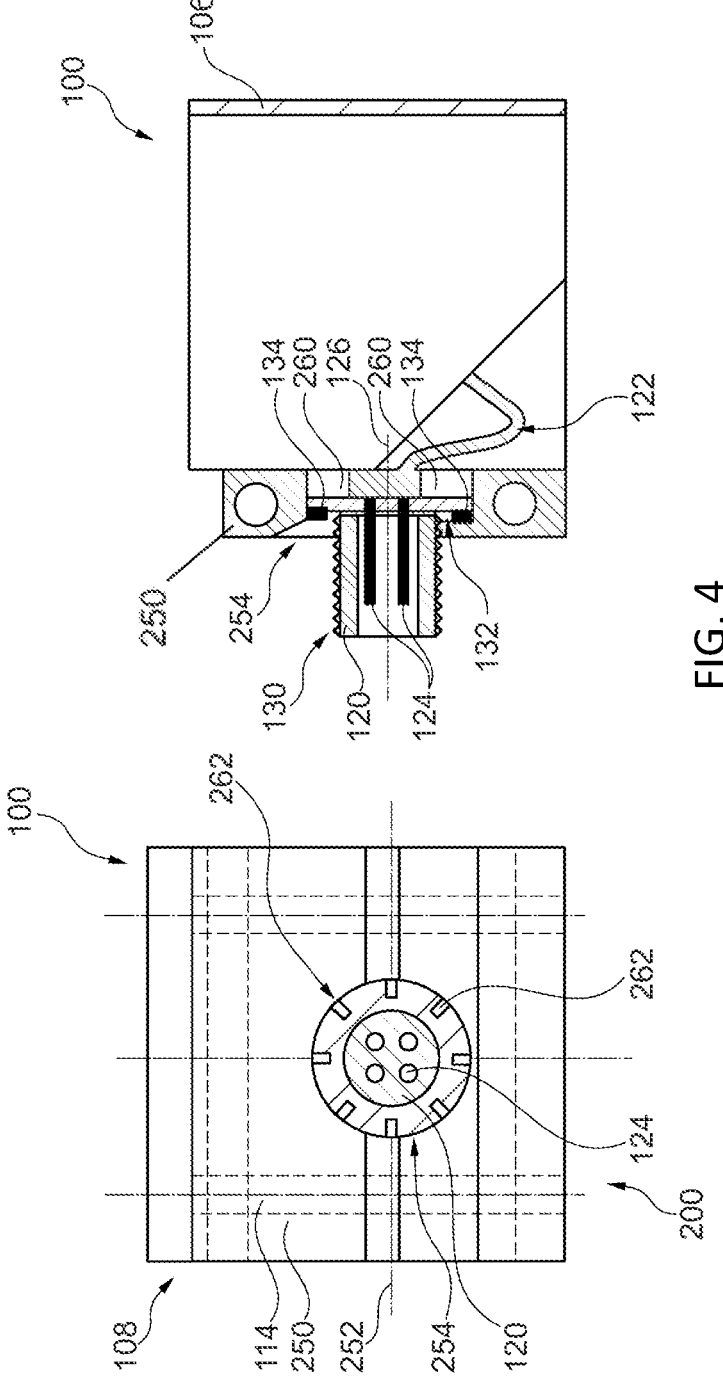
FIG. 4 shows an alternative exemplary embodiment to FIG. 3 in two partial views, one of the partial views as a sectional view.

In the exemplary embodiment of FIG. 4, a lead-through opening 254 is provided in the locking element 250 analogously to FIG. 3, with reference being made to FIG. 3 with regard to the other reference numbers and descriptions. In contrast to the embodiment according to FIG. 3, a loose plug connector 120 is provided whose four contact pins 124 are enclosed by the thread 130 and point outwards. The partial illustration on the right is a sectional view, wherein the plug axis 126 lies in the sectional plane.

As is particularly clear in the partial illustration on the right, the plug connector 120 has a flange 132 with several latching elements 134. These latching elements 134 can be received by correlating latch openings 262 arranged on the inside of the locking element 250 or in the area of a recess 260 on the inside 258 of the locking element 250 and in the mounting body 202. In this way, the rotational position of the plug connector 120 can be determined and damaging twisting of the line 122 can be prevented.

As shown in the partial illustration on the left, the latch openings 262 are designed as a continuous opening so that a user can quickly detect them optically on the connection side 228. Advantageously, a clear forced position of the plug connector 120 in a rotational position about the plug axis 126 or a defined number of rotational positions about the plug axis 126 can be achieved using the latching elements 134 and the correlating latch openings 132.

As can also be seen in the partial illustration on the right, the plug connector 120 abuts with its rear end on the rear 108 of the electronic terminal 100 and its housing 102, respectively, wherein the connector 120 and the flange 132 have some backlash in the recess 260, wherein suitable damping elements can be provided to achieve clamping of the flange 132 (not shown).

Inside the mounting body 202, a line 122 with several wires from the connector 120 to the interior of the housing 102 are provided, supplying the electronic terminal 100 with data and/or power.

The term comprising (and its grammatical variations) as used herein is used in the inclusive sense of having or including and not in the exclusive sense of consisting only of. The terms a and the as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

LIST OF REFERENCE NUMERALS 100 terminal (electronical)
102 housing
104 foot surface
106 end face
108 rear side
110 side part
112 fastening element
114 fastening element
116 angle of inclination
118 plane
120 plug connector
122 line
124 contact pins
126 plug axis
130 thread for mating connector
132 flange
134 latching element
200 mounting unit
202 mounting body
204 support surface
206 contact surface
208 contact surface
214 rotation axis
216 fastening element
218 fastening element
220 fastening element
222 angle of inclination of the support surface
228 connection side
250 locking element
252 swivel axis
254 lead-through opening
256 damping element
258 inside
260 recess
262 latch opening

The invention claimed is:

1. A mounting unit for an electronic terminal, the mounting unit comprising:
   a mounting body having a support surface, the support surface being configured to receive an electronic terminal, and one or more contact surfaces, at least one of the one or more contact surfaces being configured to be arranged on a support element;
   at least one fastening element configured to attach the mounting unit to the support element, wherein the support surface has an angle of inclination to the at least one of the one or more contact surfaces, and wherein the electronic terminal is rotatably arranged about an axis of rotation on the support surface, the axis of rotation being perpendicular to the support surface; and at least one pivotable locking element configured to lock the electronic terminal into a rotational position.

2. The mounting unit according to claim 1, wherein the locking element is swivelable about at least one swivel axis which is aligned parallel to the support surface and the at least one of the one or more contact surfaces.

3. The mounting unit according to claim 1, wherein the locking element comprises the fastening element and/or a further fastening element.

4. The mounting unit according to claim 3, wherein the locking element comprises at least two fastening elements which are aligned perpendicular to one another.

5. The mounting unit according to claim 3, wherein at least one fastening element of the at least two fastening elements is a through hole.

6. The mounting unit according to claim 5, wherein the through hole and the locking element are arranged with a common drilling axis through the through hole and the locking element when the locking element is in an end position.

7. The mounting unit according to claim 1, wherein the fastening element has at least one bearing section on which the electronic terminal is rotatably mounted.

8. The mounting unit according to claim 1, wherein the locking element comprises at least two sub-elements, wherein the at least two sub-elements are swivelable about a same swivel axis or about one of two mutually parallel swivel axes, respectively.

9. The mounting unit according to claim 1, wherein the locking element and/or the mounting body has a lead-through opening.

10. The mounting unit according to claim 9, wherein the locking element comprises a recess on a side facing the support surface, the recess being configured for form-fit and/or force-fit reception of at least one partial contour of a plug connector.

11. The mounting unit according to claim 1, wherein the locking element is swivelable about a swivel axis and is raisable and lowerable transversely to the swivel axis.

12. An electronic terminal comprising:
   a housing having a plurality of sides, wherein a side of the plurality of sides is an end face configured as a detection side and/or a functional side, and wherein a mounting unit according to claim 1 is attached to the housing.

13. The electronic terminal according to claim 12, wherein the electronic terminal is a sensor or a data detection device.

14. The mounting unit according to claim 1, wherein the angle of inclination is 45°.

15. The mounting unit according to claim 7, wherein the electronic terminal is rotatably mounted on a complementary counter-bearing section.

16. The mounting unit according to claim 9, wherein the locking element and the mounting body each have a part of an opening which jointly form the lead-through opening.

17. The mounting unit according to claim 11, wherein the locking element is configured to be raisable and lowerable in the locking position.

* * * * *